United States Patent
Kirkeby et al.

(10) Patent No.: US 8,243,967 B2
(45) Date of Patent: Aug. 14, 2012

(54) HAND-HELD ELECTRONIC DEVICE

(75) Inventors: Ole Kirkeby, Espoo (FI); Leo M. Karkkainen, Helsinki (FI); John May, Ropley (GB)

(73) Assignee: Nokia Corporation, Espoo (FI)

( * ) Notice: Subject to any disclaimer, the term of this patent is extended or adjusted under 35 U.S.C. 154(b) by 1630 days.

(21) Appl. No.: 11/274,381

(22) Filed: Nov. 14, 2005

(65) Prior Publication Data

US 2007/0110265 A1    May 17, 2007

(51) Int. Cl.
  *H04R 5/02*  (2006.01)
  *H04R 9/06*  (2006.01)
  *H04R 1/02*  (2006.01)
  *H04B 7/00*  (2006.01)
  *H04M 1/00* (2006.01)

(52) U.S. Cl. ........ 381/300; 381/306; 381/334; 381/311; 381/89; 455/41.2; 455/556.1; 455/569.117

(58) Field of Classification Search .................. 381/300, 381/306, 334, 311, 89; 455/41.2, 556.1, 455/550.1, 569.1
See application file for complete search history.

(56) References Cited

U.S. PATENT DOCUMENTS

| | | |
|---|---|---|
| 3,236,949 A | 2/1966 | Atal et al. |
| 5,136,650 A | 8/1992 | Griesinger |
| 5,136,651 A | 8/1992 | Cooper et al. |
| 5,384,851 A | 1/1995 | Fujimori |
| 5,687,239 A | 11/1997 | Inanaga et al. |
| 5,949,894 A | 9/1999 | Nelson et al. |
| 6,580,932 B1 | 6/2003 | Finke-Anlauff |
| 6,614,910 B1 | 9/2003 | Clemow et al. |
| 6,760,447 B1 | 7/2004 | Nelson et al. |
| 6,901,148 B2 * | 5/2005 | Yoshino et al. ............... 381/103 |
| 7,215,975 B1 | 5/2007 | Sharp |
| 7,454,026 B2 | 11/2008 | Yamada |
| 2004/0131202 A1 | 7/2004 | Cranfill et al. |
| 2005/0131562 A1 | 6/2005 | Kang et al. |
| 2005/0135629 A1 | 6/2005 | Kim et al. |
| 2006/0067547 A1* | 3/2006 | Le et al. ........................ 381/300 |
| 2006/0115090 A1 | 6/2006 | Kirkeby |
| 2007/0060204 A1 | 3/2007 | Lee |
| 2007/0065220 A1 | 3/2007 | Kemppinen |
| 2007/0184882 A1 | 8/2007 | Kim |
| 2007/0191078 A1 | 8/2007 | Kim |
| 2007/0254729 A1 | 11/2007 | Freund |
| 2009/0324002 A1 | 12/2009 | Richardson |

FOREIGN PATENT DOCUMENTS

CN    1905715    1/2007

(Continued)

OTHER PUBLICATIONS

International Search Report and Written Opinion received for corresponding Patent Cooperation Treaty Application No. PCT/FI2009/050500, dated Oct. 7, 2009, 16 pages.

(Continued)

*Primary Examiner* — Devona Faulk
(74) *Attorney, Agent, or Firm* — Locke Lord LLP (57) ABSTRACT

A hand-held electronic device for producing stereo effect sound in both a first and a second orientation of the device. The first and second directions are perpendicular to each other. The device comprises a pair of loudspeakers spaced from each other in two directions perpendicular to each other. One direction always lies in a horizontal plane irrespective of whether the device is in its first or second orientation.

17 Claims, 5 Drawing Sheets

FOREIGN PATENT DOCUMENTS

| | | |
|---|---|---|
| DE | 19633292 | 9/1997 |
| DE | 19943065 | 3/2001 |
| EP | 0880871 | 12/1998 |
| EP | 1124175 | 8/2001 |
| EP | 1194007 | 4/2002 |
| EP | 1580966 | 9/2005 |
| EP | 1610530 | 12/2005 |
| EP | 1657889 | 5/2006 |
| EP | 1675362 | 6/2006 |
| FR | 2874781 | 3/2006 |
| JP | 5041900 | 2/1993 |
| JP | 2003078601 | 3/2003 |
| JP | 2003078601 A * | 3/2003 |
| KR | 10-2005-0067555 | 7/2005 |
| WO | 9515069 | 6/1995 |
| WO | 2006089969 | 8/2006 |
| WO | 2006123211 | 11/2006 |

OTHER PUBLICATIONS

Witheiler, Matthew, "PaceBook PaceBlade: The Tablet PC Arrives", dated May 17, 2002, webpage available at: http://www.anandtech.com/showdoc.aspx?i=1621&p=2.

International Search Report and Written Opinion received for related Patent Cooperation Treaty Application No. PCT/IB2006/053928, dated Mar. 23, 2008, 13 pages.

Office Action received for related Chinese Patent Application No. 200580040788.8, dated Mar. 27, 2009, 11 pages of office action translation.

Office Action received for related Chinese Patent Application No. 200580040788.8, dated Sep. 4, 2009, 09 pages of office action translation.

Office Action received for related Korean Patent Application No. 2007-7012031, dated Nov. 21, 2008, 02 pages of office action translation.

International Search Report and Written Opinion received for related Patent Cooperation Treaty Application No. PCT/FI2005/050437, dated Feb. 24, 2006, 9 pages.

World Wide Web, http://downloadcenter.samsung.com/content/EM/200710/20071030091728859/EN/main.html, Samsung YP-S5, retrieved on Jul. 2, 2010, 1 page.

World Wide Web, http://www.akihararanews.com/en/news-15657-Rotating+Speakers+Case+from+Green-House.html, Akhihabara News, published on Mar. 10, 2008, 1 page.

Official Action from related U.S. Appl. No. 12/147,701, dated Jul. 14, 2011, pp. 1-10.

Office Action received from related U.S. Appl. No. 10/999,842, dated Sep. 30, 2008, pp. 19.

Final Office Action received from related U.S. Appl. No. 10/999,842, dated Apr. 28, 2009, pp. 22.

Office Action received from related U.S. Appl. No. 10/999,842, dated Sep. 22, 2009, pp. 21.

Final Office Action received from related U.S. Appl. No. 10/999,842, dated Mar. 17, 2010, pp. 22.

Office Action received from related U.S. Appl. No. 10/999,842, dated Oct. 5, 2010, pp. 22.

* cited by examiner

HAND-HELD ELECTRONIC DEVICE

FIELD OF THE INVENTION

The present invention relates to a hand-held electronic device including a mobile telecommunications device such as a mobile phone or PDA, having loudspeakers mounted therein. The invention also relates to a method of controlling such a device.

BACKGROUND OF THE INVENTION

Recent developments in hand-held electronic devices such as mobile phones have resulted in improvements in the quality of sound reproduction, thereby enabling music to be played though such devices. Conventionally, it is common for the sound to be reproduced through headphones and an internally mounted loudspeaker is used only to produce general sounds such as ring-tones and other individual tones to signify key-presses. However, these devices are increasingly being provided with internal loudspeakers that can be used to project sounds/music directly from the device towards the listener in a hands-free format in addition to ring-tones and other more general sounds relating to the operation of the device. It will be appreciated that, if an internal loudspeaker is used to enable a user to listen to music, the quality of sound reproduction becomes an important consideration.

To maximise quality, it is desirable to be able to reproduce stereo effect sound to give the listener a greater 3-D or 'spatial' effect of the projected sound. However, producing stereo sound from a device as small as a mobile phone presents a number of problems. Firstly, two separate loudspeakers are required and, when the device is orientated in a position of use, the loudspeakers must be spaced horizontally from each other by a minimum distance so that sound is directed to either side of the listener to effectively reproduce a stereo effect. As mobile telecommunication devices are relatively small, obtaining the minimum horizontal spacing between the loudspeakers is difficult. However, if suitable digital processing is used, it is possible to spatially enhance the sound to expand the sound stage dramatically and produce a stereo effect.

Figure 1A:
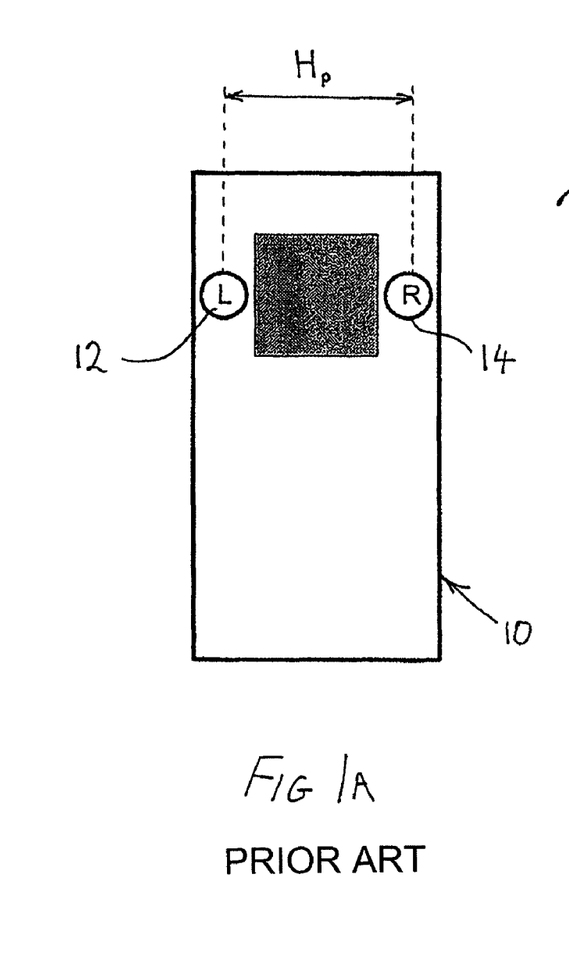
FIG. 1A is a schematic view of a prior art hand-held electronic device in an upright, portrait position.
Figure 1B:
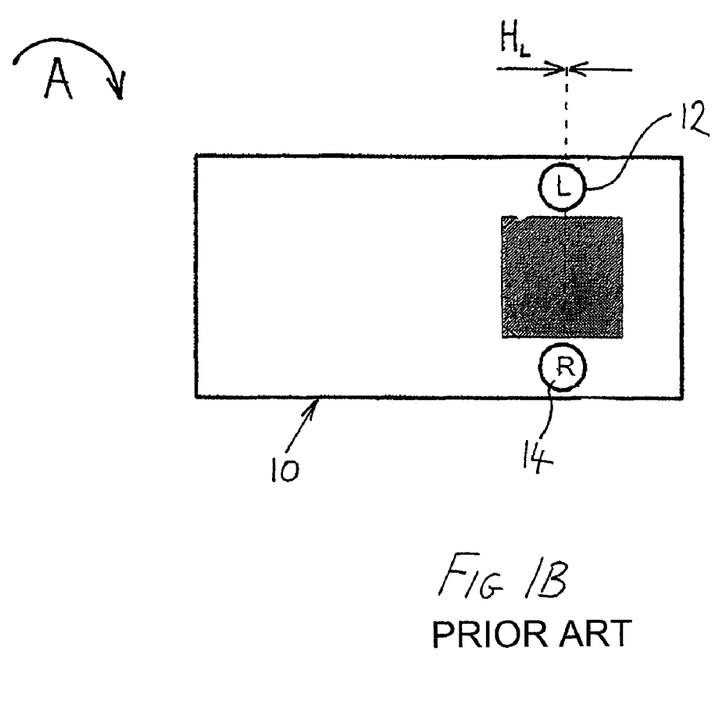
FIG. 1B is the prior art device of FIG. 1A in a sideways, landscape position.

The requirement for a minimum horizontal spacing between loudspeakers so as to direct sound towards either side of a listener leads to a problem when the device is intended for use in both an upright or 'portrait' position and also in a sideways or 'landscape' position. These two positions are illustrated by schematic front views of a prior art mobile device 10 comprising a mobile phone, shown in FIGS. 1A and 1B. When the phone 10 is being used, it is intended that it will be placed so as to face the listener in one of these positions. The 'landscape' position may be preferable, for example, when the user is also viewing information displayed on the screen in a landscape orientation, at the same time as listening to sound as the screen may be rectangular, as opposed to square in shape and the information or picture displayed may be viewed more easily in a landscape orientation. It can be seen that the phone 10 is rotated through an angle of 90 degrees between these two positions. The mobile phone 10, shown in the portrait position in FIG. 1A, has a left loudspeaker 12 and a right loudspeaker 14, separated from each other by a horizontal spacing $H_p$ which is sufficient to enable spatial enhancement and reproduction of stereo sound. However, the mobile phone 10 is shown rotated clockwise by 90 degrees (see arrow A) into the landscape position in FIG. 1B and the loudspeaker 12 is now located directly above the loudspeaker 14. This means that the horizontal spacing of the two loudspeakers 12, 14 in the landscape position $H_1$, is reduced to zero, so that they provide no spatial effect, thereby rendering production of stereo sound impossible. An example of a device of this type is known from U.S. Pat. No. 6,760,447 (P. A. Nelson et al).

One solution to the problem referred to above is to provide a first pair of loudspeakers spaced from each other in the horizontal direction to provide stereo sound when the phone is in the portrait position, and a second pair of loudspeakers displaced from each other in a vertical direction perpendicular to the direction of displacement of the first pair of loudspeakers such that, when the phone is rotated into the landscape position, the second pair of loudspeakers are horizontally displaced from each other and are thereby able to produce stereo sound.

However, this prior art solution suffers from the drawback that two pairs of loudspeakers are required in the mobile phone, which in turn leads to increased production costs and an increase in the size of the device. An alternative solution could be to provide three loudspeakers in an 'L' formation to make up the two 'pairs' of loudspeakers in which one speaker would be used when the device is in the portrait position and also when the device is in the landscape position. However, this arrangement would also suffer the drawback that three loudspeakers would be required, again, leading to increased production costs and an increase in the size of the device.

SUMMARY OF THE INVENTION

It is therefore an object of the present invention to provide a mobile device that substantially alleviates or overcomes the problems mentioned above.

Accordingly, the present invention provides a hand-held electronic device configured to reproduce stereo effect sound in both a first and a second orientation of the device perpendicular to each other, comprising a single pair of loudspeakers spaced from each other in two directions perpendicular to each other such that one of the directions always lies in a horizontal plane irrespective of whether the device is in its first or second orientation.

As there is a horizontal separation of the loudspeakers irrespective of whether the device is in the first or second orientation, sound is directed towards both sides of the listener and the spatial effect is maintained.

The mobile device is intended for use in a first upright or portrait position, and a second sideways or landscape position, the mobile device being rotated through 90 degrees between said first and second positions. The spacing between the loudspeakers in a first direction may be equal to the spacing between the loudspeakers in a second perpendicular direction. Alternatively, the spacing between the loudspeakers in a first direction may be less than or greater than the spacing between the loudspeakers in a second perpendicular direction.

The device may further include a controller configured to automatically change a digital processing algorithm used to produce the stereo effect sound to compensate for the difference in spacing between the loudspeakers in the first and second directions, when the device is rotated between the first and second positions.

The control unit may also be configured to swap the stereo sound signals fed to the loudspeakers when the orientation of the mobile device is changed between the first and second positions if, when changing the orientation of the mobile device between the first and second positions, the loudspeakers exchange places as the left-most speaker and right-most speaker respectively.

The hand-held electronic device may include a housing, the loudspeakers being disposed so as to face outwardly towards a user of the device from the housing. Alternatively, the housing may have a peripheral edge face, and at least one, or both of the loudspeakers may be disposed on the peripheral edge face of the housing. In one embodiment, the loudspeakers may be orientated so as to at least partially direct sound away from each other.

The present invention also provides a mobile telecommunications device for producing stereo effect sound in both a first and a second orientation of the device perpendicular to each other, comprising a single pair of loudspeakers spaced from each other in two directions perpendicular to each other such that one of the directions always lies in a horizontal plane irrespective of whether the device is in its first or second orientation.

The present invention also provides hand-held electronic device intended for use in two different orientations substantially at right angles to each other and configured to reproduce stereo effect sound in both said orientations, the device comprising a single pair of loudspeakers which, when the device is being used in either orientation, are spaced from each other in a direction which is substantially parallel to a fixed imaginary line of reference extending through the user's ears According to another aspect of the invention, there is provided a method of controlling a hand-held electronic device configured to reproduce stereo effect sound in both a first and a second orientation of the device perpendicular to each other, comprising a single pair of loudspeakers spaced from each other in two directions perpendicular to each other such that one of the directions always lies in a horizontal plane irrespective of whether the device is in its first or second orientation, the method including the step of altering a digital processing algorithm to compensate for the difference in spacing between the loudspeakers when the device is rotated between the first and second orientations.

According to yet another aspect of the invention, there is provided a method of controlling a hand-held electronic device configured to reproduce stereo effect sound in both a first and a second orientation of the device perpendicular to each other, comprising a single pair of loudspeakers spaced from each other in two directions perpendicular to each other such that one of the directions always lies in a horizontal plane irrespective of whether the device is in its first or second orientation, the method including the step of swapping the stereo sound signals fed to the loudspeakers when the orientation of the mobile device is changed between the first and second orientations if, when changing the orientation of the mobile device between the first and second orientations, the loudspeakers exchange places as the left-most speaker and right-most speaker respectively.

Embodiments of the present invention will now be described, with reference to FIGS. 2A-5 of the accompanying drawings, in which.

BRIEF DESCRIPTION OF THE DRAWINGS

DETAILED DESCRIPTION

Figure 2A:
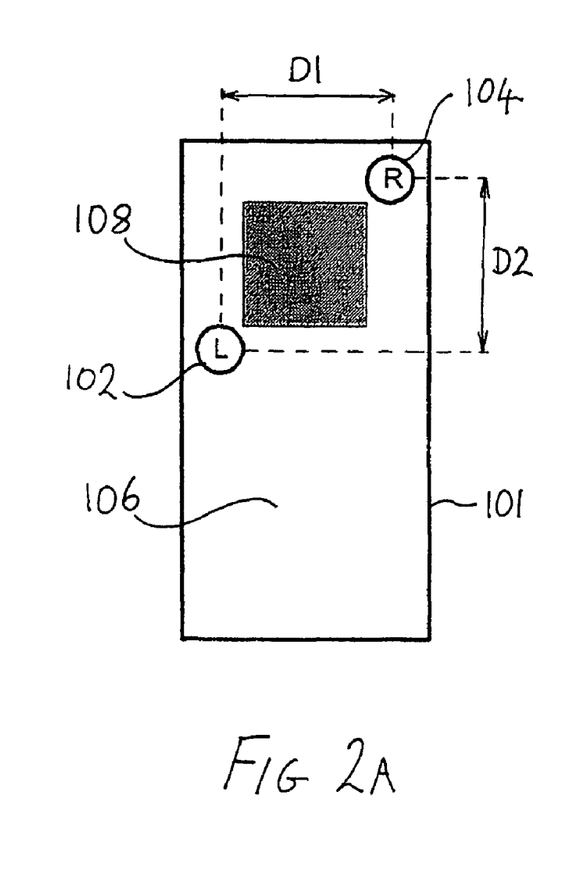
FIG. 2A is a schematic view of a hand-held electronic device according to a first embodiment of the invention in an upright, portrait position.
Figure 2B:
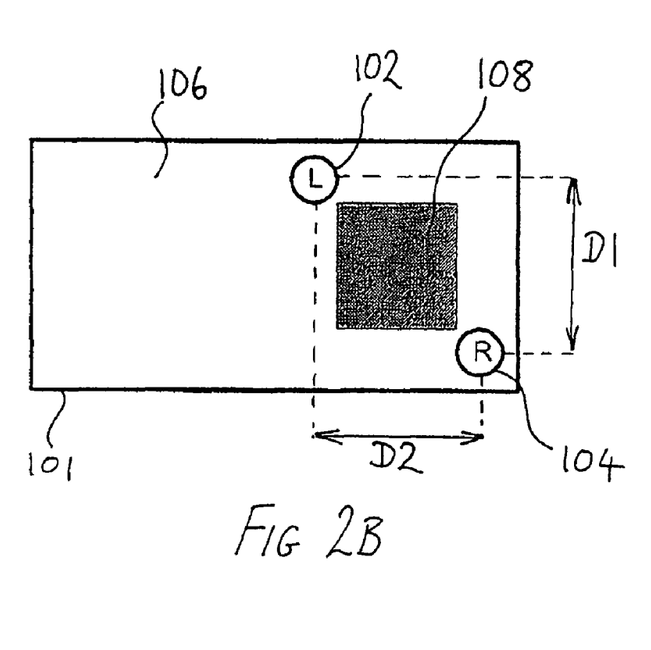
FIG. 2B is the device of FIG. 2A in a sideways, landscape position.

Referring now to FIGS. 2A and 2B, there is shown a first embodiment of a hand-held electronic device according to the present invention comprising a mobile telephone 100 having a housing 101 including a front face 106 and first and second loudspeakers 102, 104 mounted in the housing 101 so as to direct sound through apertures (not shown) in the front face 106. The front face 106 includes a display screen 108, the loudspeakers 102, 104 being disposed one either side of the display screen 108. The phone 100 is shown in the portrait position in FIG. 2A and, as a user views the front face 106 of the phone 100, the first loudspeaker 102 is on the left and the second loudspeaker 104 is on the right so as to direct sound towards the left and right hand sides of a listener, respectively. In this portrait position, the first and second loudspeakers 102, 104 are spaced from one another in the horizontal direction by a distance D1 shown in FIG. 2A. This spacing D1 between the loudspeakers is sufficient to enable the reproduction of stereo effect sound when the phone 100 is in the portrait position. However, it can be seen from FIGS. 2A and 2B that the first and second loudspeakers 102, 104 are also diagonally disposed from one another which means that they are spaced from each other in a vertical direction D2. Although this vertical spacing D2 has no discernable effect on the reproduction of stereo sound when the phone 100 is in the portrait position, when it is rotated by 90 degrees clockwise into the landscape position shown in FIG. 2B, the spacing D2 becomes a horizontal spacing of the first and second loudspeakers 102, 104 and so the phone 100 is still capable of reproducing stereo effect sound.

When stereo sound is produced, whether by conventional two-channel signals sent to two separate loudspeakers or by spatially digitally-processed signals sent to two separate loudspeakers, the electronic sound signals sent to each loudspeaker are not the same but are speaker-specific. When the phone 100 is rotated through 90 degrees clockwise (shown by arrow X) from the portrait position in FIG. 2A to the landscape position shown in FIG. 2B, from the user's view point, the first loudspeaker 102 remains on the left-hand side and the second loudspeaker 104 remains on the right-hand side. Therefore, the signals transmitted to each loudspeaker 102, 104 by a signal processing unit do not need to be swapped over for the phone 100 to continue to reproduce stereo effect sound.

Figure 3A:
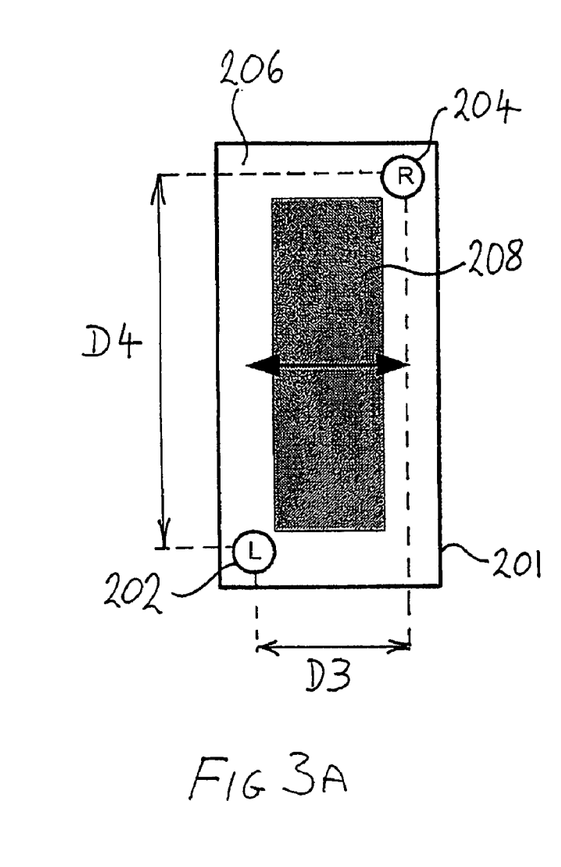
FIG. 3A is a schematic view of a hand-held electronic device according to a second embodiment of the invention in an upright, portrait position.
Figure 3B:
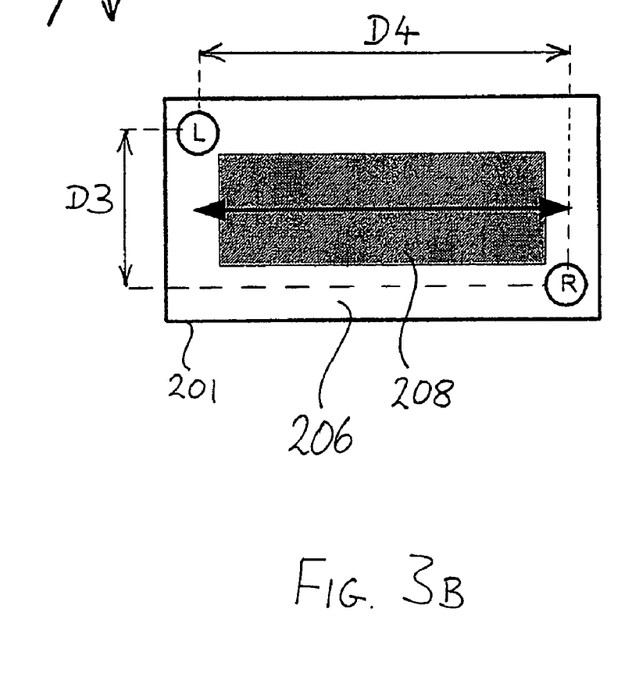
FIG. 3B is the device of FIG. 3A in a sideways, landscape position.

A second embodiment of the present invention is shown in FIGS. 3A and 3B comprising a mobile telephone 200 having a housing 201 and first and second loudspeakers 202, 204 mounted on a front face 206 of the housing 201. The front face 206 includes a display screen 208 and the loudspeakers 202, 204 are disposed one either side of the display screen 208. The phone 200 is shown in the portrait position in FIG. 3A and, as a user views the front face 206 of the phone 200, the first loudspeaker 202 is on the left-hand side and the second loudspeaker 204 is on the right-hand side so as to direct sound towards either side of a listener facing the device. In this portrait position, the first and second loudspeakers 202, 204 are spaced from one another in the horizontal direction by a distance D3 which is sufficient for the device to be able to produce stereo effect sound. As with the first embodiment 100 described above, the first and second loudspeakers 202, 204 are diagonally disposed from one another and so are spaced from each other in a vertical direction (shown as D4 in FIGS. 3A and 3B) perpendicular to the horizontal direction D3. Therefore, when the phone 200 is rotated by 90 degrees clockwise (shown by arrow Y) to the landscape position shown in FIG. 3B, the spacing D4 becomes the horizontal spacing of the loudspeakers 202, 204, thus ensuring that the phone is capable of reproducing stereo effect sound.

It can be seen that in this second embodiment, the distance D4 between the first and second loudspeakers 202, 204 in the vertical direction when the phone 200 is in the portrait position, is greater than the distance D3 in the horizontal direction. The electronic sound signals transmitted to each loudspeaker to produce stereo effect sound are calculated by a digital signal-processing audio algorithm in dependence upon a number of parameters, one of which is the spacing between the two loudspeakers. Therefore, because the horizontal spacing between the first and second loudspeakers 202, 204 differs between when the phone 201 is in the portrait position relative to the landscape position, the digital audio algorithm parameter must be changed to take account of the change in loudspeaker spacing so that the electronic signals transmitted to each loudspeaker 202, 204 are correct depending on whether the phone is in the portrait or landscape position. It has been found that a change in distance between the loudspeakers 202, 204 by a factor of up to 1.5 without changing the parameter of the digital audio algorithm to alter the electronic sound signals, has a relatively small detrimental effect on the quality of the stereo sound reproduction. For example, if D3 was 4 cm, and D4 was 6 cm, the effect on the sound quality would be negligible. However, if the factor is greater than 2, then a more serious deterioration in stereo sound reproduction is noticed and the digital algorithm parameter must be altered to take account of this when the orientation of the phone is changed. For example, if D3 is 4 cm and D4 is 8 cm, then the phone 200 would include a controller configured to detect the orientation of the phone 200 and to cause the digital audio algorithm to alter the electronic sound signals transmitted to the loudspeakers 202, 204 to take account of the difference in horizontal distance between the loudspeakers 202, 204 in the portrait position and the landscape position. As mentioned above, a user may wish to view information displayed on the screen 208 in a landscape orientation, in which case, the phone would have a control function to allow the user to manually select the desired screen orientation. In this case, the controller would not need a means to detect which orientation the phone is to be used in, as instead, the information could be taken from the manually operated control function used to display information on the screen in the correct orientation and, from this, the controller would select the correct parameter for the digital audio algorithm appropriate to the horizontal spacing of the loudspeakers.

Figure 4A:
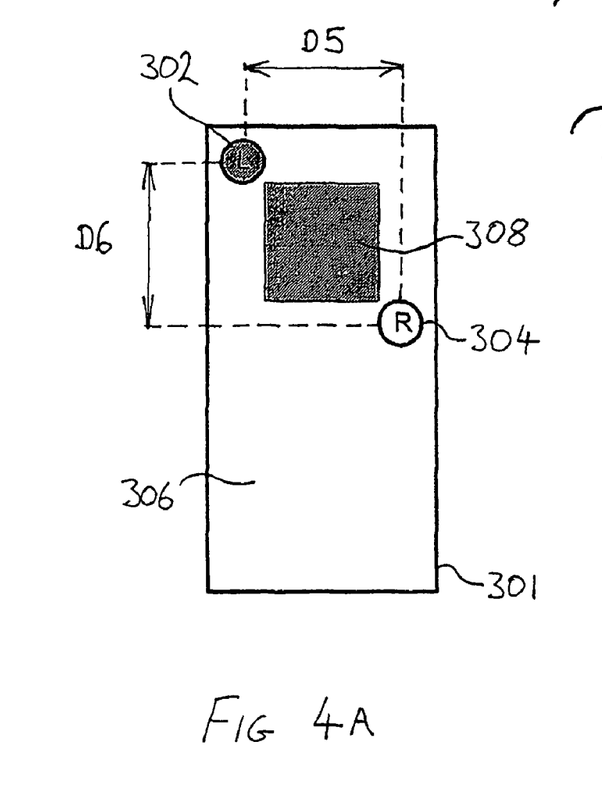
FIG. 4A is a schematic view of a hand-held electronic device according to a third embodiment of the invention in an upright, portrait position.
Figure 4B:
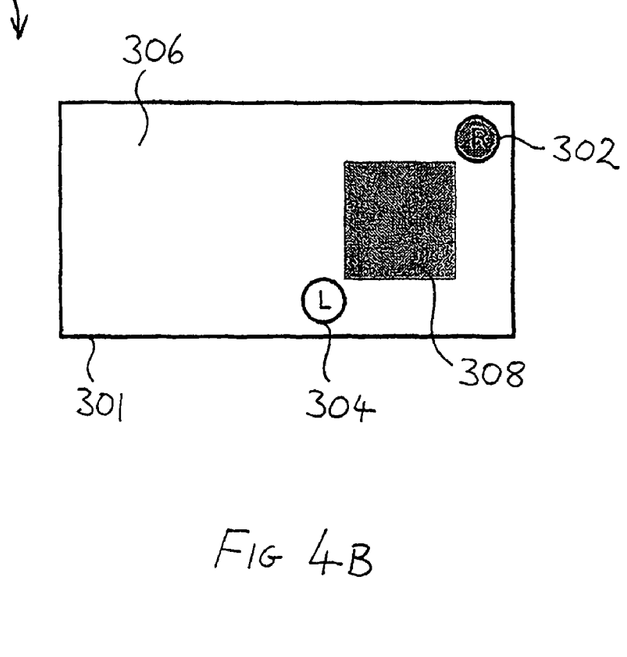
FIG. 4B is the device of FIG. 4A in a sideways, landscape position.

A third embodiment of the present invention is shown in FIGS. 4A and 4B comprising a mobile telephone 300 having a housing 301 and first and second loudspeakers 302, 304 mounted on a front face 306 of the housing 301. The front face 306 includes a display screen 308 and the loudspeakers 302, 304 are disposed one either side of the display screen 308. The phone 300 is shown in the portrait position in FIG. 4A and, as a user views the front face 306 of the phone 300, the first loudspeaker 302 is on the left-hand side and the second loudspeaker 304 is on the right-hand side. As with the first embodiment shown in FIGS. 2A and 2B, the first and second loudspeakers 302, 304 are spaced from each other in the horizontal direction by a first distance D5, and are spaced from each other in the vertical direction by a second distance D6 (see FIG. 4A). In this embodiment, the position of the loudspeakers 302, 304 is such that in the portrait position, the first loudspeaker 302 is on the left and the second loudspeaker 304 is on the right. However, when the phone 300 is rotated by 90 degrees clockwise into the landscape position as shown by arrow and FIG. 4B, the first loudspeaker 302 becomes the right loudspeaker and the second loudspeaker 304 becomes the left loudspeaker. Likewise, this loudspeaker reversal would also occur if the first and second embodiments of the invention described above and illustrated in FIGS. 2A, 2B, 3A, and 3B were rotated anti-clockwise into the landscape position. As mentioned above, to reproduce stereo effect sound, the electronic signals sent to each loudspeaker 302, 304 are not identical, but are specific to whether the loudspeaker is the right or the left loudspeaker. Therefore, to allow for the swapping of sides of the loudspeakers 302, 304 in moving between the portrait and the landscape positions, the mobile phone 300 includes a controller (not shown) to automatically detect which position the phone 300 is in and transmit the appropriate electronic signals to the correct left/right loudspeaker accordingly.

It is envisaged within the scope of the invention that a further, unillustrated embodiment may include controller functions of the second embodiment in FIGS. 3A and 3B and also of the third embodiment in FIGS. 4A and 4B. This would allow the device to be capable of detecting the horizontal spacing between the loudspeakers in the portrait and landscape positions and to alter the electronic stereo sound signals transmitted to each loudspeaker accordingly if the horizontal spacing changes, and also to detect which loudspeaker was the left loudspeaker and which was the right loudspeaker for whichever orientation the device was positioned in to ensure that each loudspeaker receives the correct electronic stereo sound signal to reproduce the desired stereo effect sound.

Figure 5:
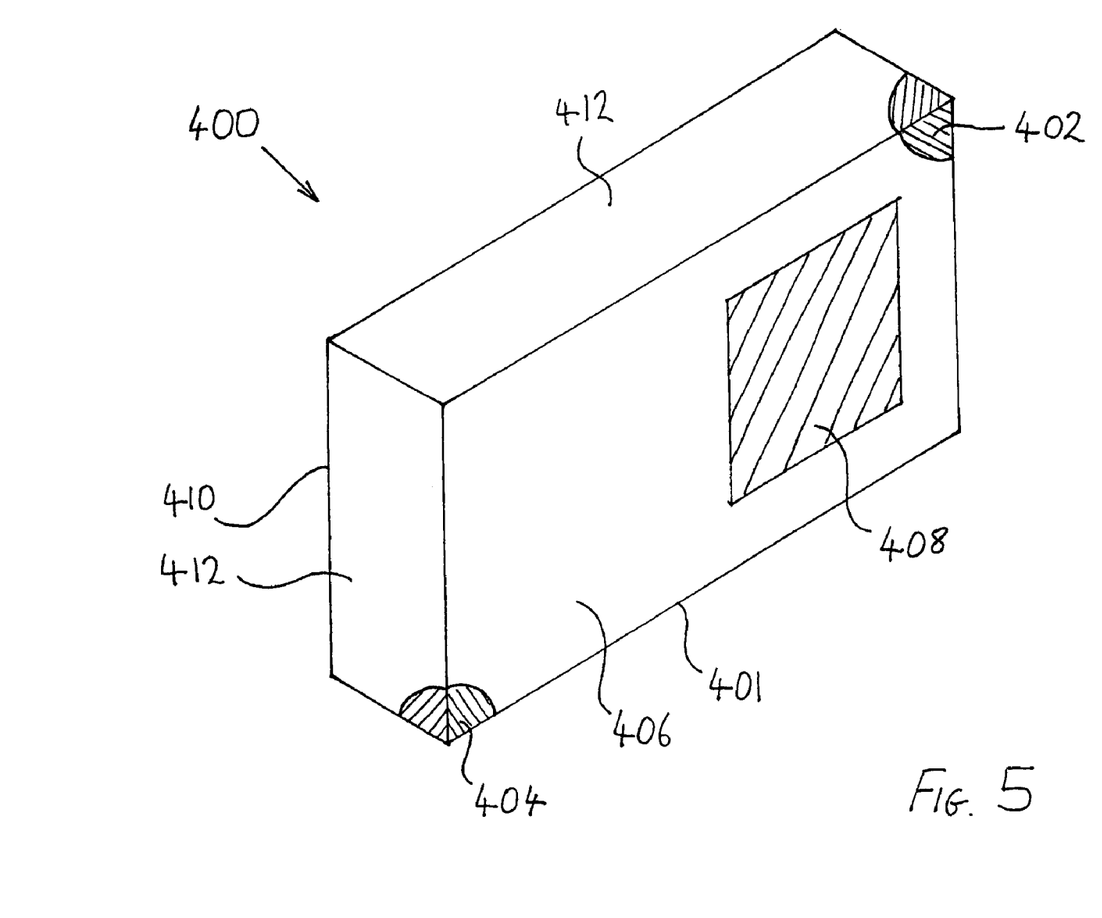
FIG. 5 is a schematic view of a hand-held electronic device according to a fourth embodiment of the invention.

The various embodiments described above have all been shown with the loudspeakers positioned on one single face of the device. However, further embodiment 400, illustrated in FIG. 5, shows how the loudspeakers could be arranged in an alternative configuration. This fourth embodiment 400 comprises a housing 401 having a front face 406 with a display screen 408, a rear face 410 and a peripheral edge face 412. First and second loudspeakers 402, 404 are disposed at diagonally opposed corners of the device 400, with the first loudspeaker 402 extending over one corner of the front face 406 and the peripheral edge face 412 at the top and one side of the device, and the second loudspeaker 404 extending over the diagonally opposite corner of the front face 406 and the peripheral edge face 412 at the bottom and opposite side so that sound is directed towards the user of the device from both the front and side of the device. The device would operate as described above with reference to the first to third embodiments of the invention, except that the sound projection from the first and second loudspeakers 402, 404 would be improved due to the outward projection of sound that could be achieved over flat face-mounted speakers.

It is also envisaged that the speakers could be located so as to face wholly outwardly from either side of the housing rather that having at least a portion facing towards the user. In such a configuration, the design tuning of the device would be critical to maximise performance.

Many modifications and variations of the invention falling within the terms of the appended claims will be apparent to those skilled in the art and the foregoing description should be regarded as a description of the preferred embodiments only.

The invention claimed is:

1. A hand-held electronic device configured to reproduce stereo sound in both a first and a second orientation of the device perpendicular to each other, comprising a first loudspeaker and a second loudspeaker, wherein the first and second loudspeakers are left and right loudspeakers, respectively, relative to each other in the first orientation of the device, and the first and second loudspeakers are spaced from each other in two directions perpendicular to each other such that one of the directions always lies in a horizontal plane when the device is in its first or second orientation, and the device further comprising a control unit configured to change a digital processing algorithm used to reproduce the stereo sound to compensate for a difference in spacing between the first and second loudspeakers in the two directions, when the device is rotated between the first and second orientations.

2. A hand-held electronic device according to claim 1 wherein the device is configured for use in a first upright or portrait orientation, and a second sideways or landscape orientation, the device being rotated through 90 degrees between said first and second orientations.

3. A hand-held electronic device according to claim 2 wherein the spacing between the loudspeakers in a first direction is less than the spacing between the loudspeakers in a second perpendicular direction.

4. A hand-held electronic device according to claim 1 wherein the control unit is configured to determine which one of the first and second orientations the device is in and swap stereo sound signals to the first and the second loudspeakers when the first and second loudspeakers are right and left loudspeakers, respectively, relative to each other in the second orientation of the device.

5. A hand-held electronic device according to claim 1 including a housing, wherein the loudspeakers are disposed so as to face outwardly towards a user of the device from the housing.

6. A hand-held electronic device according to claim 1 including a housing having a peripheral edge face, wherein at least one loudspeaker is disposed on the peripheral edge face of the housing.

7. A hand-held electronic device according to claim 1 including a housing having a peripheral edge face, wherein both loudspeakers are disposed on the peripheral edge face of the housing.

8. A hand-held electronic device according to claim 1 wherein the loudspeakers are orientated to direct sound away from each other.

9. A mobile telecommunications device for producing stereo sound in both a first and a second orientation of the device perpendicular to each other, comprising a first loudspeaker and a second loudspeaker, wherein the first and second loudspeakers are left and right loudspeakers, respectively, relative to each other in the first orientation of the device, and the first and second loudspeakers are spaced from each other in two directions perpendicular to each other such that one of the directions always lies in a horizontal plane when the device is in its first or second orientation, and the device further comprising a control unit configured to change a digital processing algorithm used to reproduce the stereo sound to compensate for a difference in spacing between the first and second loudspeakers in the two directions, when the device is rotated between the first and second orientations.

10. A hand-held electronic device intended for use in two different orientations substantially at right angles to each other and configured to reproduce stereo sound in both said orientations, the device comprising a first loudspeaker and a second loudspeaker, wherein the first and second loudspeakers are left and right loudspeakers, respectively, relative to each other in the first orientation of the device, and the first and second loudspeakers, when the device is being used in either orientation, are spaced from each other in a direction which is substantially parallel to a fixed imaginary line of reference extending through the ears of a user of the device, and the device further comprising a control unit configured to change a digital processing algorithm used to reproduce the stereo sound to compensate for a difference in spacing between the first and second loudspeakers, when the device is rotated between the first and second orientations.

11. A method of controlling a hand-held electronic device configured to reproduce stereo sound in both a first and a second orientation of the device perpendicular to each other, the devices including a first loudspeaker and a second loudspeaker, wherein the first and second loudspeakers are left and right loudspeakers, respectively, relative to each other in the first orientation of the device, and the first and second loudspeakers are spaced from each other in two directions perpendicular to each other such that one of the directions always lies in a horizontal plane when the device is in its first or second orientation, the method comprising changing a digital processing algorithm used to reproduce the stereo sound to compensate for a difference in spacing between the first and second loudspeakers in the two directions, when the device is rotated between the first and second orientations.

12. A method of controlling a hand-held electronic device configured to reproduce stereo sound in both a first and a second orientation of the device perpendicular to each other, the device including a first loudspeaker and a second loudspeaker, wherein the first and second loudspeakers are left and right loudspeakers, respectively, relative to each other in the first orientation of the device, and the first and second loudspeakers are spaced from each other in two directions perpendicular to each other such that one of the directions always lies in a horizontal plane when the device is in its first or second orientation, the method comprising changing a digital processing algorithm used to reproduce the stereo sound to compensate for a difference in spacing between the first and second loudspeakers in the two directions, when the device is rotated between the first and second orientations.

13. A hand-held electronic device according to claim 4 wherein determining which one of the first and second orientations the device is in is based on receiving an indication of a user's manual selection of a device orientation or automatically detecting a device orientation.

14. A mobile telecommunications device according to claim 9, wherein the control unit is further configured to determine which one of the first and second orientations the device is in and swap stereo sound signals to the first and the second loudspeakers when the first and second loudspeakers are right and left loudspeakers, respectively, relative to each other in the second orientation of the device, and wherein determining which one of the first and second orientations the device is in is based on receiving an indication of a user's manual selection of a device orientation or automatically detecting a device orientation.

15. A hand-held electronic device according to claim 10, wherein the control unit is further configured to determine which one of the first and second orientations the device is in and swap stereo sound signals to the first and the second loudspeakers when the first and second loudspeakers are right and left loudspeakers, respectively, relative to each other in the second orientation of the device, and wherein determining which one of the first and second orientations the device is in is based on receiving an indication of a user's manual selection of a device orientation or automatically detecting a device orientation.

16. A method according to claim 11, further comprising determining which one of the first and second orientations the device is in and swapping stereo sound signals to the first and the second loudspeakers when the first and second loudspeakers are right and left loudspeakers, respectively, relative to each other in the second orientation of the device, and wherein determining which one of the first and second orientations the device is in is based on receiving an indication of a user's manual selection of a device orientation or automatically detecting a device orientation.

17. A method according to claim 12, further comprising determining which one of the first and second orientations the device is in and swapping stereo sound signals to the first and the second loudspeakers when the first and second loudspeakers are right and left loudspeakers, respectively, relative to each other in the second orientation of the device, and wherein determining which one of the first and second orientations the device is in is based on receiving an indication of a user's manual selection of a device orientation or automatically detecting a device orientation.

* * * * *